(12) United States Patent
Hara

(10) Patent No.: US 12,277,958 B2
(45) Date of Patent: Apr. 15, 2025

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/421,805

(22) Filed: Jan. 24, 2024

(65) Prior Publication Data
US 2025/0095679 A1    Mar. 20, 2025

(30) Foreign Application Priority Data
Sep. 20, 2023  (JP) ................................ 2023-152120

(51) Int. Cl.
*G11B 5/596*  (2006.01)

(52) U.S. Cl.
CPC ................................ *G11B 5/59688* (2013.01)

(58) Field of Classification Search
None
See application file for complete search history.

(56) References Cited

U.S. PATENT DOCUMENTS

| | | | |
|---|---|---|---|
| 5,831,787 A * | 11/1998 | Yoshida | G11B 5/5547 360/78.09 |
| 6,496,315 B1 * | 12/2002 | Ueda | G11B 5/59627 360/78.01 |
| 7,400,467 B1 | 7/2008 | Calihan et al. | |
| 9,025,269 B1 | 5/2015 | Wong et al. | |
| 9,240,198 B1 * | 1/2016 | Hara | G11B 5/012 |
| 9,947,352 B1 * | 4/2018 | Sudo | G11B 5/5547 |
| 10,748,569 B1 * | 8/2020 | Ogawa | G11B 5/59666 |
| 10,872,631 B1 | 12/2020 | Tagami et al. | |
| 2004/0125495 A1 * | 7/2004 | Schmidt | G11B 5/59633 360/53 |
| 2020/0286517 A1 * | 9/2020 | Tagami | G11B 20/10268 |
| 2021/0027805 A1 * | 1/2021 | Asakura | G11B 5/02 |
| 2022/0406331 A1 * | 12/2022 | Obara | G11B 20/1217 |

FOREIGN PATENT DOCUMENTS

JP          2021-44030 A          3/2021

* cited by examiner

*Primary Examiner* — Peter Vincent Agustin
(74) *Attorney, Agent, or Firm* — Maier & Maier, PLLC

(57) ABSTRACT

According to one embodiment, a magnetic disk device comprises a head position demodulation unit which demodulates a position of the head by performing switching between normal servo demodulation for processing servo information written to a servo sector of the disk and short servo demodulation for processing servo information by a short servo system, and a controller comprises a head position prediction unit which predicts a head position, and the head position prediction unit performs position prediction by using a latest head position obtained by demodulation by the head position demodulation unit and a head position obtained by past demodulation by normal servo demodulation.

5 Claims, 9 Drawing Sheets

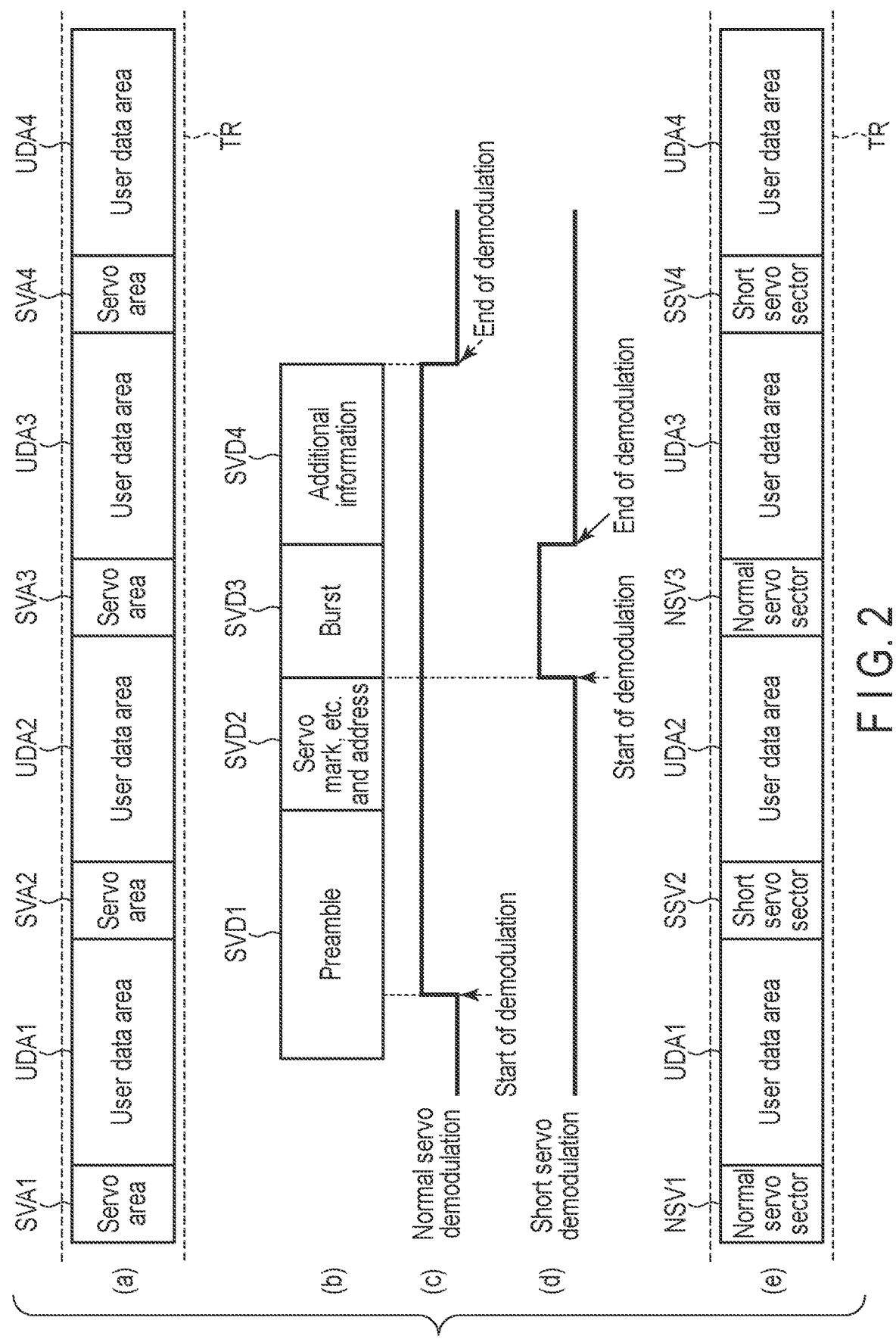
F I G. 2

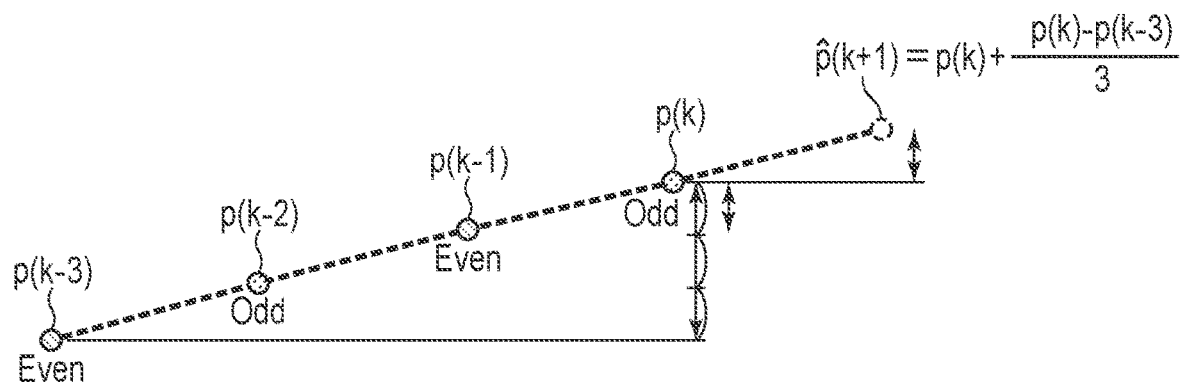
F I G. 11
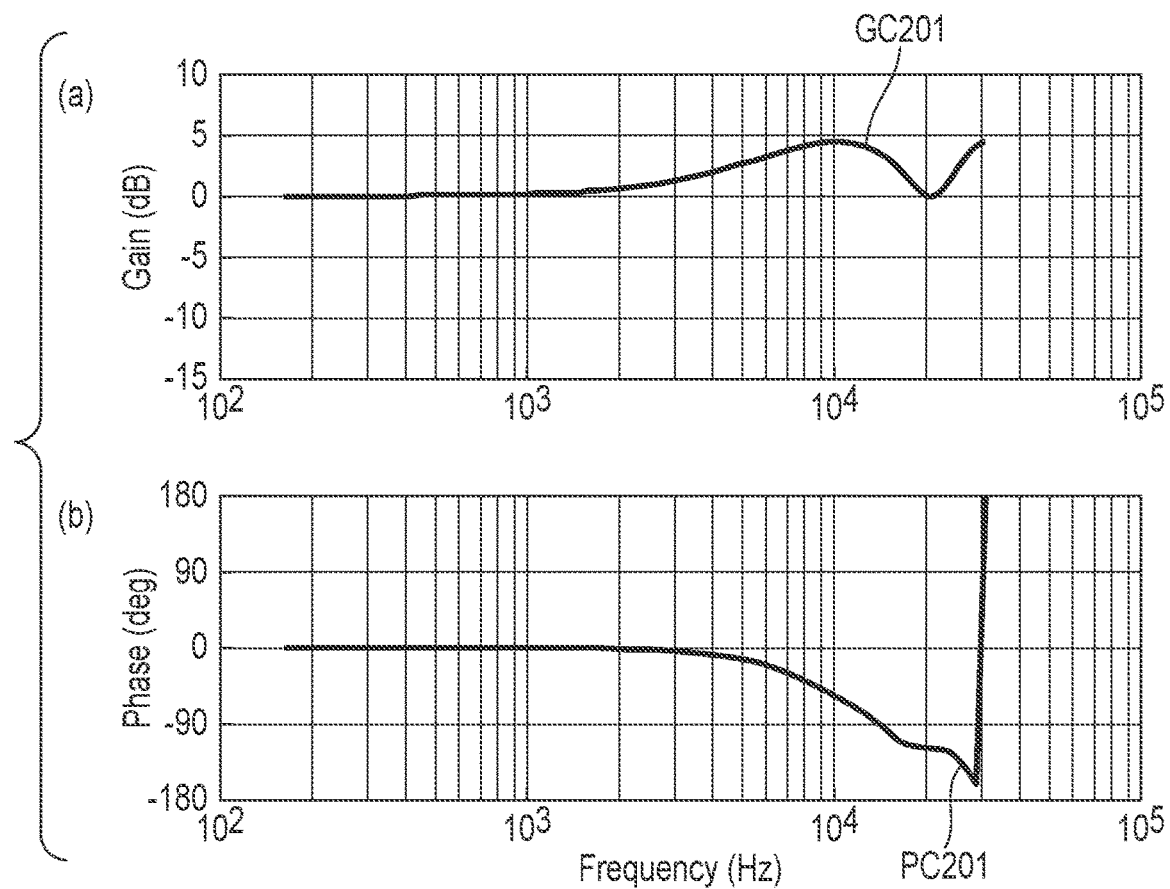
F I G. 12

MAGNETIC DISK DEVICE

CROSS-REFERENCE TO RELATED APPLICATIONS

This application is based upon and claims the benefit of priority from Japanese Patent Application No. 2023-152120, filed Sep. 20, 2023, the entire contents of which are incorporated herein by reference.

FIELD

Embodiments described herein relate generally to a magnetic disk device comprising a write inhibition process of a head.

BACKGROUND

In magnetic disk devices such as hard disk drives (HDDs), tracking control is performed to position each head on the target track of a rotating disk. In the tracking control, the position of the head is detected using servo information which has been written to the disk. To prevent the effect of a time lag between the detection process of the head position and the process of writing data to the disk, etc., a method for predicting the position of the head is used. To detect the position of the head, head position demodulation using a short servo system, which is a technique for decreasing the occupancy of servo information on disks, may be employed in some cases.

However, in the head position demodulation using a short servo system, the effect of detection errors of the positions of heads tends to be great compared with a case of head position demodulation using normal servo information without using a short servo system.

The object to be achieved by embodiments is to provide a magnetic disk device and a prediction method such that the position of a head is predicted based on a head position demodulated by a short servo system.

BRIEF DESCRIPTION OF THE DRAWINGS

FIG. 2 is a diagram showing the outline of the format of the servo information of the magnetic disk device according to the embodiment.

FIG. 11 is a schematic diagram showing an example of the calculation method of the position prediction of the head of a magnetic disk device according to a second embodiment.

FIG. 12 is an example of the frequency characteristics of the position prediction unit of the magnetic disk device according to the second embodiment.

DETAILED DESCRIPTION

Embodiments will be described hereinafter with reference to the accompanying drawings. The drawings are merely examples and do not limit the scope of the invention.

In general, according to one embodiment, a magnetic disk device comprises a disk, a head, a head position demodulation unit which demodulates a position of the head (head position) by performing switching between normal servo demodulation for processing servo information written to a servo sector of the disk and short servo demodulation for processing servo information by a short servo system, and a controller which controls the position of the head, wherein the controller comprises a head position prediction unit which predicts a head position and a write inhibition determination unit which determines that data write operation to the disk by the head is inhibited based on the predicted head position, and the head position prediction unit performs position prediction by using a latest head position obtained by demodulation by the head position demodulation unit and a head position obtained by past demodulation by normal servo demodulation.

Embodiments

Here, this specification mainly shows the basic configuration, basic principle and the like of embodiments.

Figure 1:
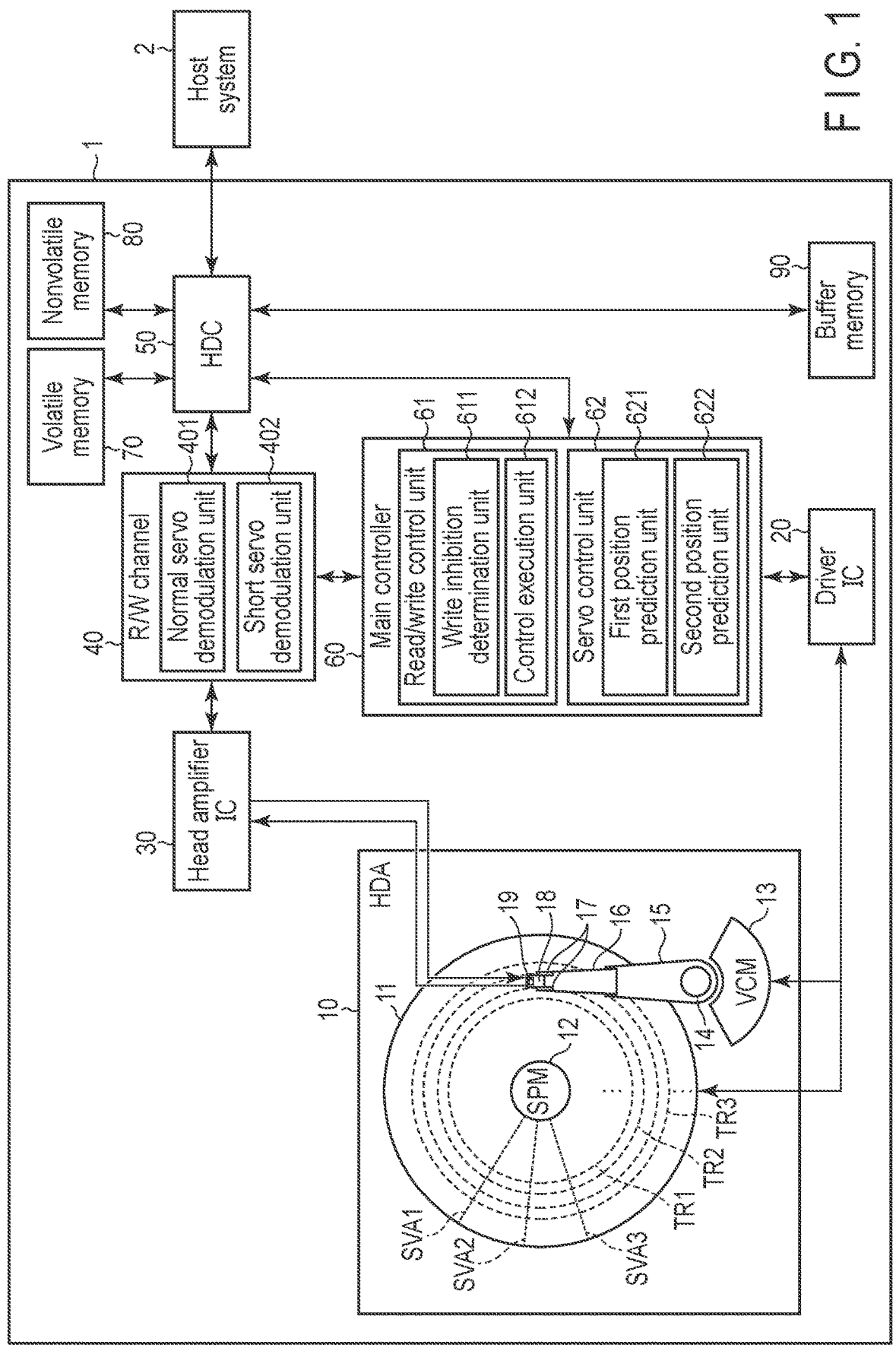
FIG. 1 is a configuration diagram of a magnetic disk device according to an embodiment.

FIG. 1 is a configuration diagram of a magnetic disk device according to an embodiment.

The magnetic disk device 1 is a storage device comprising a magnetic disk 11 (which may be simply referred to as a disk hereinafter) for reading and writing data and comprises a computer function such as a microprocessor. The magnetic disk device 1 outputs data to a host system 2 connected to the magnetic disk device 1 and writes data input from the host system 2 to the disk 11 based on a command, etc., received from the host system 2.

The host system 2 is, for example, a personal computer body, and outputs a read command which is a command for reading the data of the disk 11 to the magnetic disk device 1, and outputs a write command which is a command for writing data to the magnetic disk device 1 with the data to be written to the disk.

An HDA 10 is called a head disk assembly. The disk 11, a spindle motor 12 (which may be referred to as an SPM hereinafter), a voice coil motor 13 (which may be referred to as a VCM hereinafter), an arm 15 on which a head 19 is mounted and the like are accommodated in the housing of the HDA 10. The embodiment shows an example in which one disk 11 and one head 19 are provided in the HDA 10. However, one or more disks 11 and one or more heads 19 may be provided.

The disk 11 is a magnetic rotatable disk storage medium having the shape of a rotating disk. In the disk 11, a user data area which can be used by a user and a system area to which information necessary for system management is written are allocated to a data area to which data can be written (which may be referred to as write). Hereinafter, a direction orthogonal to the radial direction of the disk 11 is referred to as a circumferential direction. The disk 11 is attached to the spindle motor 12 and is rotated by driving the spindle motor 12.

A plurality of tracks are set in the disk 11. In the example of FIG. 1, three tracks TR1, TR2 and TR3 (when not particularly distinguished from each other, referred to as a track TR) are shown. In practice, a plurality of tracks are concentrically set in the data area around the spindle motor 12. When the data read/write of the disk 11 is performed, the head 19 is moved to the track TR which has the data to be read/written (target data) by seeking control, tracking control, etc., and the head 19 reads/writes the data. The track TR which has the target data may be called a target track.

Servo information has been written to the disk 11 and is used to, for example, detect the position of the head 19. The servo information is provided at positions (servo areas or servo sectors) which are determined in advance in the circumferential direction of the disk 11. The servo information is explained later.

In the example of FIG. 1, three servo areas SVA1, SVA2 and SVA3 (when not particularly distinguished from each other, referred to as a servo area SVA) are shown as examples of the servo areas. However, in general, servo areas SVA are provided at regular intervals in the whole circumferential direction of the disk 11. Servo information is written to the servo areas SVA of each track TR. The magnetic disk device 1 can detect the current position of the head 19 by the servo information read by the head 19.

The spindle motor 12 is a support of the disk 11 and is provided in the housing of the magnetic disk, etc. When the spindle motor 12 rotates, the disk 11 rotates.

The VCM 13 is a voice coil motor type of actuator and is used to move the arm 15, etc. The VCM 13 controls the operation of the arm 15, etc., based on the input current or voltage.

A pivot 14 supports the arm 15, etc., and is a bearing for rotation, etc.

The arm 15 is an arm which supports a suspension 16, a slider 18 and the head 19. The arm 15 transmits the power from the VCM 13 to the head 19 and moves the head 19 to the target track TR.

The suspension 16 is a portion which supports the slider 18 and the head 19 and comprises a micro-actuator 17.

The micro-actuator (MA) 17 performs high-accuracy positional adjustment such as the tracking control of the head 19 based on the input current or voltage. As the micro-actuator 17 is a common function, detailed description thereof is omitted. In short, the micro-actuator 17 performs the fine adjustment of the position at the time of settling after seeking control and tracking control for the target track after seeking control relative to the head 19. The settling refers to the time which is required until the positioning error relative to the target track is decreased to, for example, a threshold or less after the move of the head 19 by seeking control including the effect of the oscillation of the head 19 by the seeking control. After the oscillation of the head 19 is reduced so as to be sufficiently less by settling, the read/write control of data and tracking control are performed.

The slider 18 is supported by the suspension 16 and supporting the head 19 and floating above the disk 11. The slider 18 transmits the power from the VCM 13 to the head 19 and moves the head 19 to the target track TR.

The suspension 16 is a portion which supports the slider 18 and the head 19, and controls the operation of the micro-actuator 17 connected to the suspension 16.

The head 19 is a portion which writes data to the disk 11 and reads the data recorded in the data tracks of the disk 11. When there is a need for differentiation in particular, a head which writes data to the disk 11 is called a write head 19W, and a head which reads the data recorded in the data tracks of the disk 11 is called a read head 19R.

A driver IC 20 outputs current or voltage for driving and controlling the SPM 12, the VCM 13, the micro-actuator 17, etc., in accordance with the control from an HDC 50, a servo control unit 62, etc.

A head amplifier IC 30 comprises a read amplifier and a write driver. The read amplifier amplifies a read signal read from the disk 11 and outputs it to an R/W channel 40. The write driver outputs write current based on a signal output from the R/W channel 40 to the head 19.

The R/W channel 40 receives a read data signal from the head amplifier IC 30 and extracts read data based on an instruction from the HDC 50, a main controller 60, etc., and generates a write data signal and outputs it to the head amplifier IC 30 based on the write data of a write instruction. The R/W channel 40 comprises a function for measuring the signal quality of read data received from the head amplifier IC 30. The R/W channel 40 demodulates a servo information signal received from the head amplifier IC 30 and extracts the position information of the head 19. The R/W channel 40 comprises a normal servo demodulation unit 401 which performs normal servo demodulation to extract the position information of the head (normal servo position information), and a short servo demodulation unit 402 which performs short servo demodulation to extract the position information of the head (short servo position information).

The HDC 50 is an interface between the magnetic disk device 1 and the host system 2 and is a hard disk controller which controls the units of the magnetic disk device 1. The HDC 50 may consist of a computer function such as a CPU, an IC chip, etc. The HDC 50 receives commands such as an instruction for writing data from the host system 2 to the disk 11 and an instruction for reading the data of the disk 11. The HDC 50 controls the units of the magnetic disk device 1 and performs data transfer between the host system 2 and the R/W channel 40 based on received commands. The HDC 50 may control data read/write relative to a volatile memory 70, a buffer memory 90, a nonvolatile memory 80, etc.

The main controller 60 is a main controller which controls the units of the magnetic disk device 1. For example, the main controller 60 may consist of a computer function such as a microprocessor, an IC chip, etc. The various processes of the main controller 60 may be performed by programs of software (including firmware) or may be provided as hardware or combinations of software and hardware.

A read/write control unit 61 selects the storage destination of write data (for example, the information of a data sector or track of the disk 11) and controls the data write operation to the disk 11 based on a command received from the host system 2, etc. The read/write control unit 61 notifies the servo control unit 62, etc., of the storage destination of read data (for example, the information of a data sector or track of the disk 11), operates the head 19 and controls the data read operation of the disk 11 based on a command received from the host system 2, etc.

The read/write control unit 61 controls the read and write of the head 19 based on a head prediction position input from the servo control unit 62, etc. The read/write control unit 61 comprises a write inhibition determination unit 611 which determines whether or not user data can be written to the disk 11 by the head 19, and a control execution unit 612 which controls the read/write of the head 19 based on the determination result of the write inhibition determination unit 611, etc.

The servo control unit 62 controls the head 19 of data based on, for example, a command received from the host system 2. For example, the servo control unit 62 performs seeking control for controlling the VCM 13 via the driver IC 20 and tracking control to move the head 19 to the target position (target track). The servo control unit 62 performs the tracking control of the head 19 by controlling the micro-actuator 17 via the driver IC 20.

More specifically, the servo control unit 62 determines an input current value or an input voltage value as a control value for the seeking control and tracking control of the head 19 based on the target position of the head 19 determined based on a command received from the host system 2, etc., and the current position of the head 19 received from the R/W channel 40, and outputs the determined value to the VCM 13 and the micro-actuator 17.

The servo control unit 62 comprises first and second position prediction units 621 and 622 which predict the position of the head 19 from normal servo position information and short servo position information input from the R/W channel 40. The operation of the first position prediction unit 621 and the second position prediction unit 622 is explained later.

The volatile memory 70 is a semiconductor memory in which the stored data is lost when power supply is stopped. The volatile memory 70 stores data necessary for the processes in the magnetic disk device 1, etc. The volatile memory 70 is, for example, a dynamic random access memory (DRAM) or a synchronous dynamic random access memory (SDRAM).

The nonvolatile memory 80 is a semiconductor memory which records the stored data even if power supply is stopped. The nonvolatile memory 80 is, for example, a NOR or NAND flash read only memory (FROM).

The buffer memory 90 is a semiconductor memory which temporarily records data transferred between the magnetic disk device 1 and the host system 2, etc. It should be noted that the buffer memory 90 may be an integral unit with the volatile memory 70. The buffer memory 90 is, for example, a DRAM, a static random access memory (SRAM), SDRAM, a ferroelectric random access memory) (FeRAM) or a magnetoresistive random access memory (MRAM).

The buffer memory 90 indicates the work memory of the main controller 60. The buffer memory 90 may be included in the volatile memory 70 and the nonvolatile memory 80.

FIG. 2 is a diagram showing the outline of the format of the servo information of the magnetic disk device according to the embodiment.

FIG. 2(a) is a diagram showing the outline of the data format in one track TR on the disk 11. The servo areas (SVA1, SVA2, SVA3) provided between the user data areas (UDA1, UDA2, UDA3) are allocated at intervals on the track TR. To each servo area SVA, servo information SVI is written in advance.

FIG. 2(b) is a diagram which more specifically shows the format of servo information SVI. Servo data SVD1 including a preamble, servo data SVD2 including a servo mark and address, servo data SVD3 including a burst, servo data SVD4 including additional information and the like are written.

FIG. 2(c) is a diagram showing the demodulation timing of the servo information (normal servo information) of the normal servo demodulation unit 401. When the normal servo demodulation unit 401 detects a preamble SVD1, the normal servo demodulation unit 401 starts the demodulation of servo information, demodulates the position of the head 19 from the data including servo data SVD2, servo data SVD3 and servo data SVD4, and outputs the position information of the head 19 to, for example, the servo control unit 62. At the time point when servo data SVD4 is demodulated, the normal servo demodulation unit 401 detects the end of servo information and terminates the demodulation process. When the normal servo demodulation unit 401 detects the preamble SVD1 of the next servo sector, the normal servo demodulation unit 401 starts a demodulation process and demodulates the position information of the head 19 in a similar manner, and subsequently performs a similar process for each servo sector.

FIG. 2(d) is a diagram showing the demodulation timing of the servo information (short servo information) of the short servo demodulation unit 402. The short servo demodulation unit 402 processes short servo information (in FIG. 2(b), servo data SVD3) which is part of the servo information processed by the normal servo demodulation unit 401. The short servo demodulation unit 402 does not perform servo mark detection relative to the servo information of each short servo sector. The short servo demodulation unit 402 opens a gate at a certain time point based on the servo mark detected in the last normal servo sector, loads a servo burst signal (corresponding to servo data SVD3 of FIG. 2(b)) and demodulates the head position. Thus, when a short servo system is adopted, servo mark detection is not performed for the demodulation position of each short servo sector. Therefore, the positioning demodulation error of the head 19 by the short servo demodulation unit 402 tends to be great by the effect of the jitter of the burst SVD3.

FIG. 2(e) shows an example of the format of the track TR when a normal servo sector NSV and a short servo sector SSV are alternately distributed. In the embodiment, as shown in FIG. 2(e), the servo sectors are processed so as to alternate normal and short servo sectors. For example, the even sectors are assumed to be normal sectors, and the odd sectors are assumed to be short servo sectors.

A servo information signal read from the head 19 is input to the R/W channel 40 through the head amplifier IC 30. In the R/W channel 40, relative to the servo information signal input from the head amplifier IC 30, the normal servo demodulation unit 401 and the short servo demodulation unit 402 alternately extract position information for the normal servo sectors and the short servo sectors and input the position information to the servo control unit 62.

In some cases, when the head 19 performs write operation for the disk 11 using the position information of the head 19 obtained by servo information, a write inhibition (write fault) process for stopping the write process may be performed. The outline of the write inhibition process is shown below.

Figure 3:
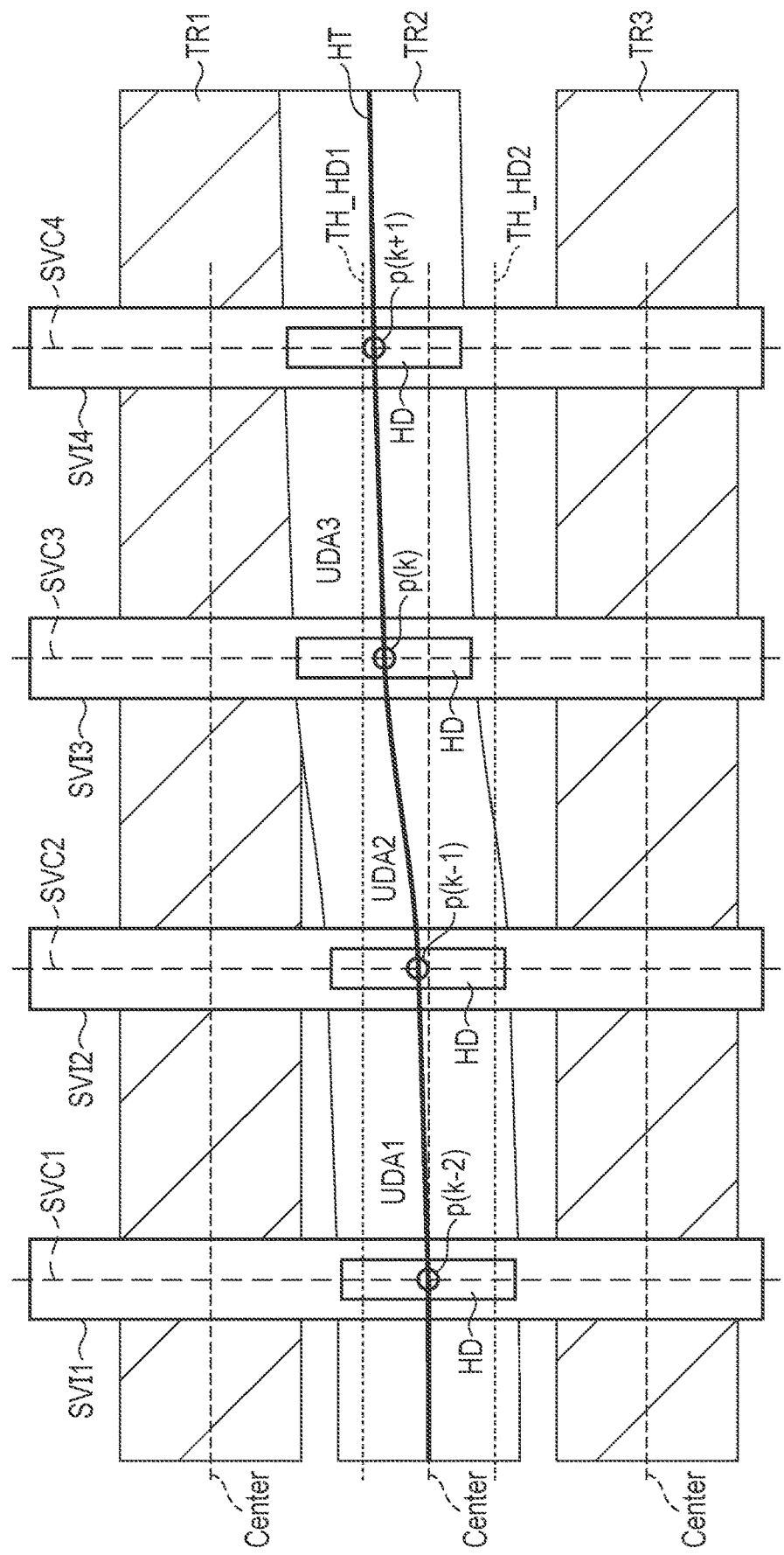
FIG. 3 is a schematic diagram showing the positional relationship between the head of the magnetic disk device and the desired track on which writing should be performed.

FIG. 3 is a schematic diagram showing the positional relationship between the head of the magnetic disk device and the desired track on which writing should be performed. The horizontal direction indicates time. The locus HT indicates an example of the temporal transition of the position of the head HD. In the disk, the tracks adjacent to track TR2 are defined as tracks TR1 and TR3. Servo information SVI1, SVI2 and SVI3 has been written in order between data areas. The symbol "p(k)" indicates the position of the head HD at a discrete time point k.

As shown by the locus HT, the head HD is displaced from the desired track TR2 by the oscillation caused in the magnetic disk device, etc. When the head HD writes data to the track TR2, and a large gap is generated in the positional relationship between the head HD and the center of the desired track TR (in the figure, "center"), the data of the adjacent track TR1 or TR3 may be destroyed. In this case, a process for inhibiting the head HD from writing data to track TR2 is a write inhibition process. The symbols "TH_HD1" and "TH_HD2" are examples of thresholds relative to the position of the head 19. For example, when the desired track is track TR2, and the demodulated position information of the head 19 exceeds thresholds TH_HD1 and TH_HD2, a write inhibition process is performed.

The write inhibition process has some conditions. One of the conditions is a write inhibition process (write fault) by a prediction position. There is a possibility that a time lag is generated between the acquisition process of head position information based on servo information and the operation of a process for writing data to the disk by the head, etc. Therefore, for example, p(k+1) which is the position at time point k+1 is predicted at time point k. In the write inhibition process, whether or not a data write process at and after time point k+1 can be performed is determined based on the predicted value of p(k+1). For the calculation of the prediction position, for example, a simple primary interpolation or linear regression coefficient optimization is considered. For example, the simplest implementation of the prediction position is realized by a primary interpolation. The outline is shown below.

Figure 4:
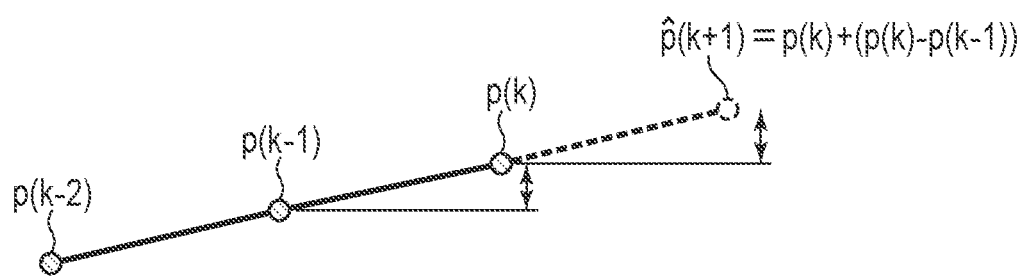
FIG. 4 is a schematic diagram showing the calculation method of the position prediction of the head by a simple primary interpolation.

FIG. 4 is a schematic diagram showing the calculation method of the prediction of the position of the head by a simple primary interpolation.

If positions p(k−2), p(k−1) and p(k) are obtained as the positions of the head HD from servo information, the prediction position p{hat} (k+1) of the head HD of time point k+1 at time point k are shown by formula 1. In the descriptions, the expression "p{hat}" shows that a hat mark (circumflex accent or caret) is present on p.

$$\hat{p}(k+1)=p(k)+(p(k)-p(k-1))=2p(k)-p(k-1) \quad \text{(Formula 1)}$$

The object of write inhibition by a prediction position is to reduce the possibility that the data of adjacent tracks (TR1 and TR3) is eroded because of deviation (overrun) from a write inhibition slice.

Head position error signals can be obtained only by a discrete time, and further, a time delay occurs between the demodulation process of the head position and a write inhibition process. Thus, even if a write inhibition process is performed with a threshold, there is a possibility that data is written with deviation from the threshold practically. In order not to delete the data of adjacent tracks, this deviation amount needs to be less than or equal to a certain amount. Thus, in addition to write inhibition determination by the current position (demodulated head position information), write inhibition determination by a prediction position is used.

Here, (p(k)−p(k−1)) shows the difference from the previous sample, in other words, a velocity component. In the velocity estimation by the positional difference, the error is large. Thus, in the write inhibition determination by a prediction position error by formula 1, a threshold (th2) which is greater than a write inhibition determination threshold (th1) by the current position is used. The determination condition at this time is shown by the following inequality.

$$2p(k)-p(k-1)>th2 \quad \text{(Formula 2)}$$

Here, when th2=a1×th1, the inequality can be rewritten as follows.

$$(2/a1) \times p(k)-(1/a1) \times p(k-1)>th1 \quad \text{(Formula 3)}$$

At this time, the discrete time transfer function from p to p{hat} can be shown as follows by using the z-transform.

$$\frac{\hat{P}(z)}{P(z)} = 2z^{-1} - z^{-2} \quad \text{(Formula 4)}$$

Figure 5:
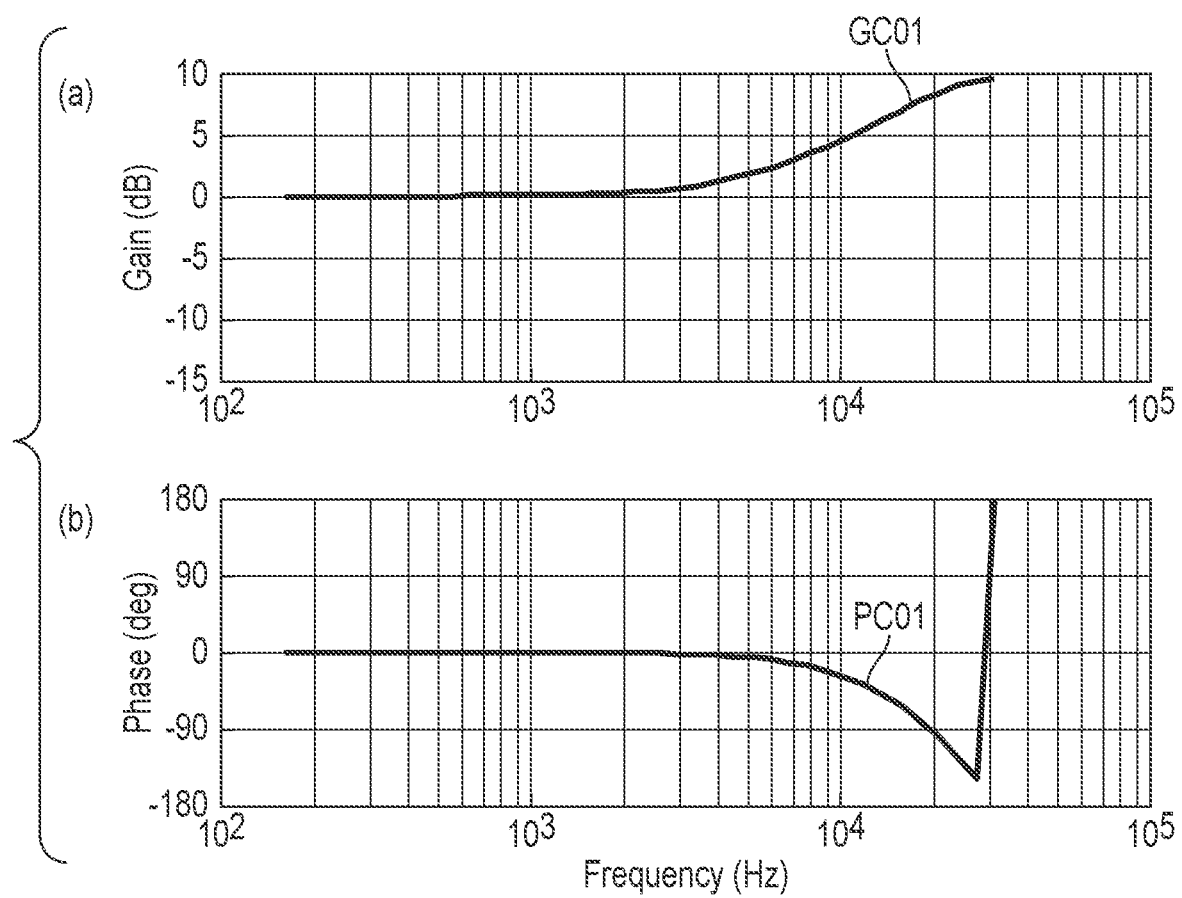
FIG. 5 is an example of the frequency characteristics of position prediction in the magnetic disk device using position prediction by a simple primary interpolation.

FIG. 5 is an example of the frequency characteristics of position prediction in the magnetic disk device using position prediction by a simple primary interpolation and is obtained from formula 4.

It is clear that the gain is high particularly in a high-frequency area. Thus, when the calculation of a prediction position is performed by formula 1, there is a possibility that the error included in (p(k)−p(k−1)) corresponding to a velocity component is large, and the performance may be degraded as write is inhibited more than necessary.

First Embodiment

This embodiment shows an example of a magnetic disk device which switches the calculation method of the prediction position of a head between a short servo sector and a normal servo sector. For example, the calculation method of the prediction position of the head is switched between the even sectors and the odd sectors, assuming that the even sectors are normal servo sectors, and the odd sectors are short servo sectors.

This specification explains the operation of the embodiment in detail below.

Figure 6:
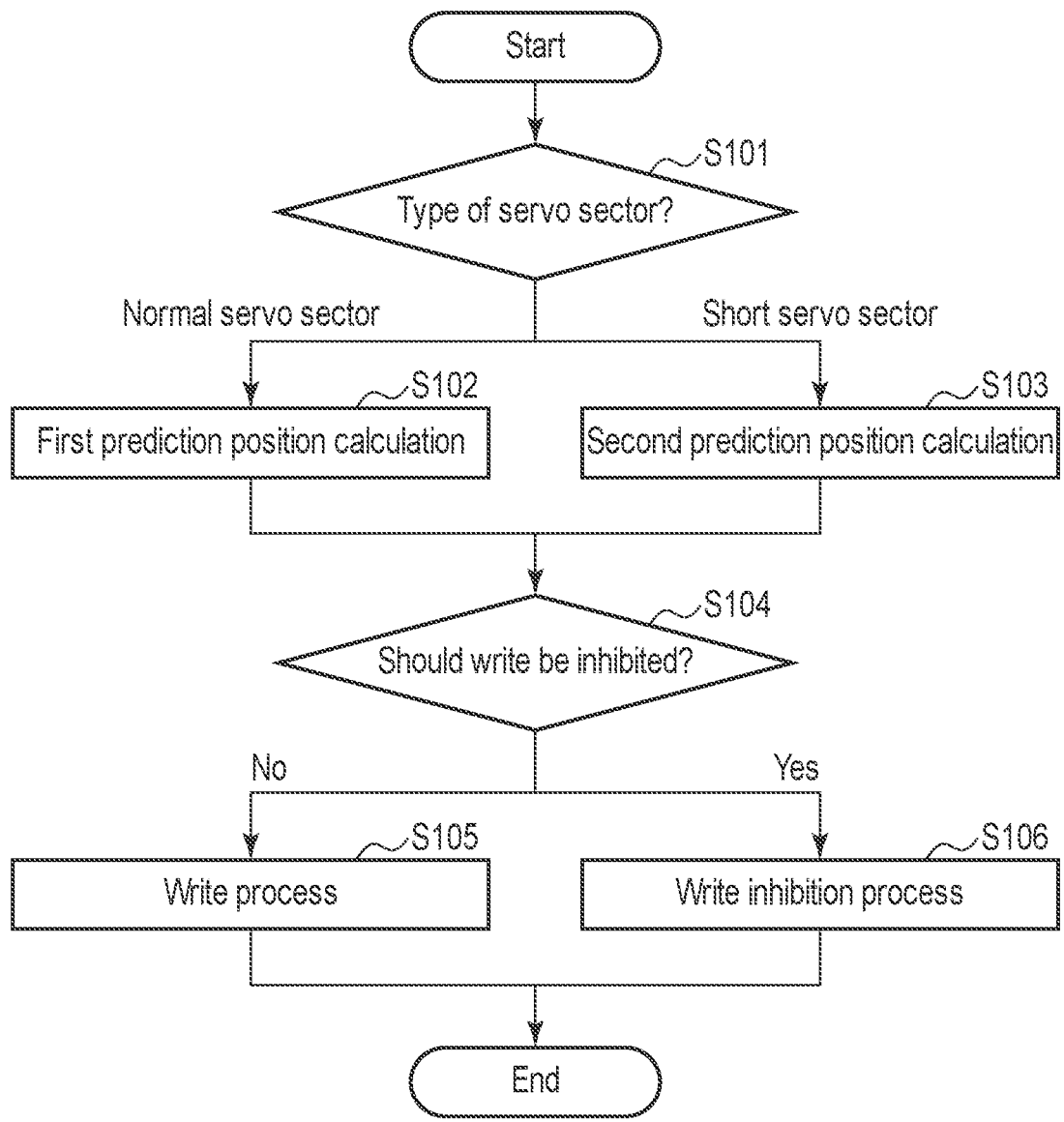
FIG. 6 is a flowchart showing the processing operation of the servo control unit of a magnetic disk device according to a first embodiment.

FIG. 6 is a flowchart showing the processing operation of the servo control unit of the magnetic disk device according to the first embodiment.

When the servo sector which is in process is a normal servo sector, an R/W channel 40 inputs the position information demodulated in a normal servo demodulation unit 401 to a first position prediction unit. When the servo sector which is in process is a short servo sector, the R/W channel 40 inputs the position information demodulated in a short servo demodulation unit 402 to a second position prediction unit (step S101).

Figure 7:
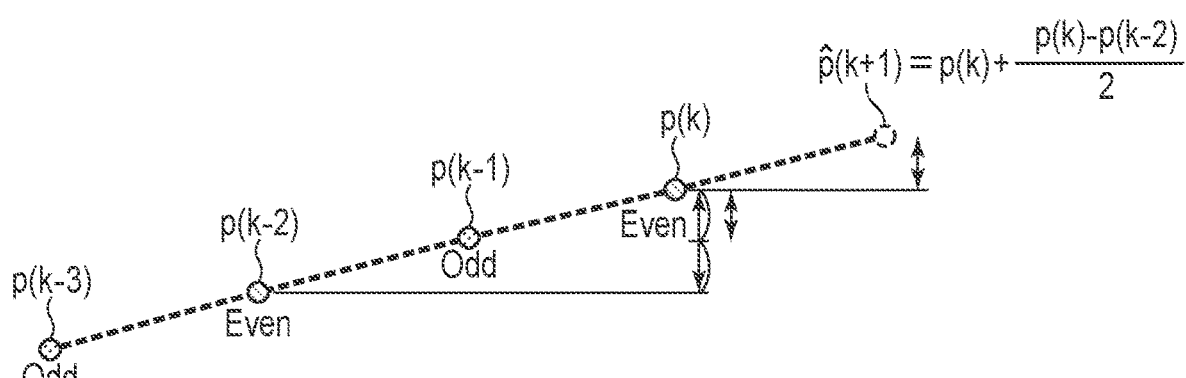
FIG. 7 is a schematic diagram showing an example of the calculation method of the position prediction of a head in relation to the first position prediction unit of the magnetic disk device according to the first embodiment.

FIG. 7 is a schematic diagram showing an example of the calculation method of the position prediction of the head in relation to the first position prediction unit of the magnetic disk device according to the first embodiment.

When the sector which is processed at time point k is a normal servo sector (even sector), the previous sector which is processed at time point k−1 is a short servo sector (odd sector). Thus, when the difference from the previous sector is obtained, the velocity estimation error is expected to be large as the position information demodulated from short servo sectors tends to have a large error.

In consideration of this matter, the first position prediction unit calculates the velocity from the difference from the position information obtained in the normal servo sector (even sector) which is processed at time point k−2, in other words, which is the sector two sectors before. Thus, the first position prediction unit always performs the calculation of the velocity term from the difference between the last normal servo sectors.

More specifically, the first position prediction unit calculates prediction position p{hat} (k+1) as shown by formula 5.

$$\hat{p}(k+1) = p(k) + \frac{p(k) - p(k-2)}{2} = 1\frac{1}{2}p(k) - \frac{1}{2}p(k-2) \quad \text{(Formula 5)}$$

At this time, the discrete time transfer function from p to p{hat} can be shown as follows by using the z-transform.

$$\frac{\hat{P}(z)}{P(z)} = 1.5z^{-1} - 0.5z^{-3} \quad \text{(Formula 6)}$$

In this manner, the error included in the difference term (velocity term) of the calculation of a prediction position is not affected by the error of the position information demodulated from short servo sectors and depends on only the error of the position information demodulated from normal servo sectors.

Figure 8:
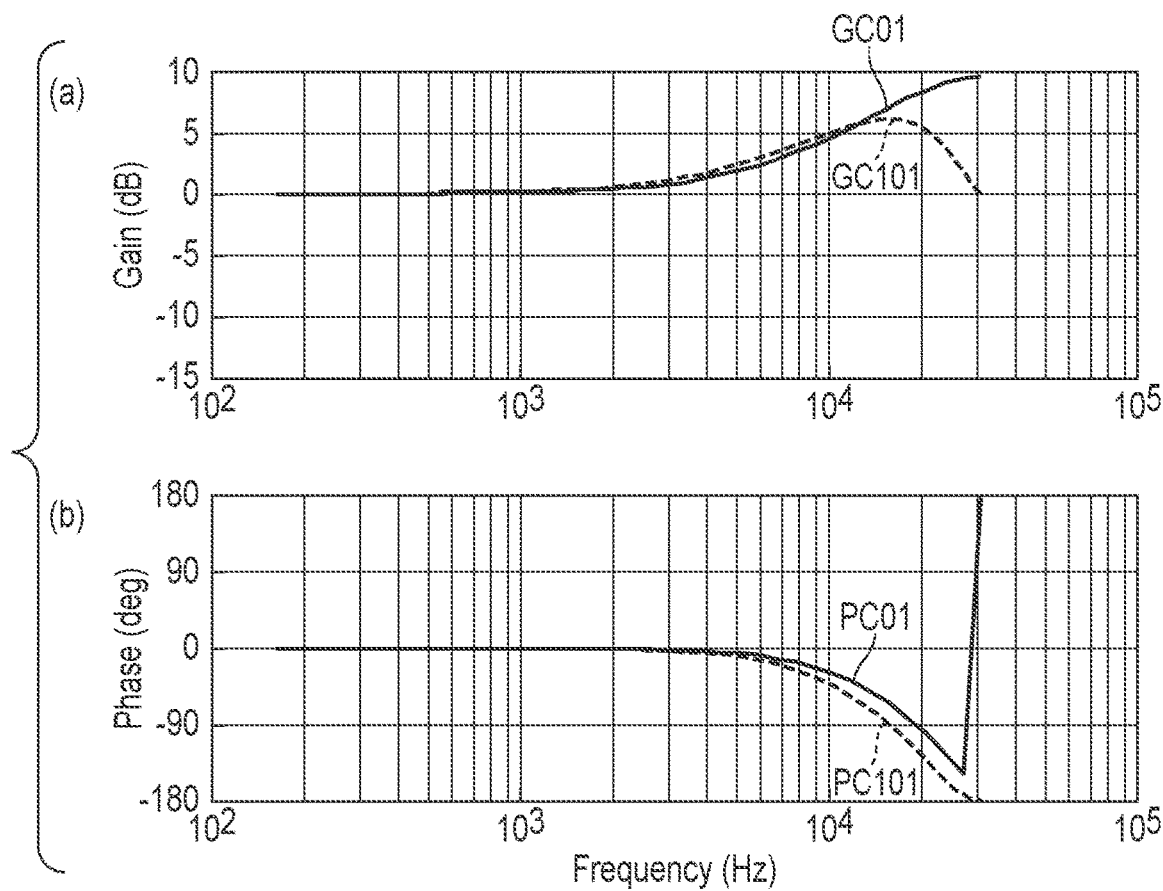
FIG. 8 is an example of the frequency characteristics of the first position prediction unit of the magnetic disk device according to the first embodiment.

FIG. 8 is an example of the frequency characteristics of the first position prediction unit of the magnetic disk device according to the first embodiment.

Frequency characteristics GC01 and PC01 are the frequency characteristics of the position prediction process by formula 1. It is clear that the gain of a high range is decreased in frequency characteristics GC101 and PC101 of the position prediction process by formula 5.

Figure 9:
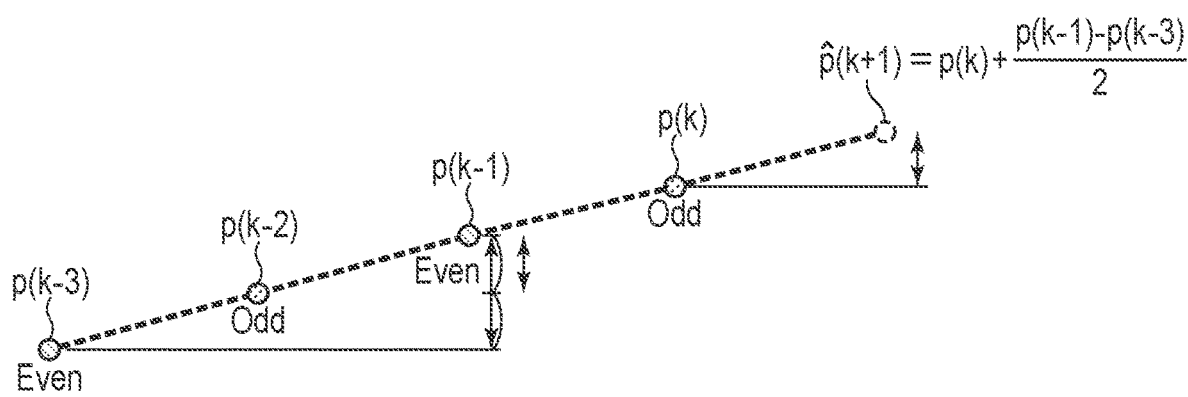
FIG. 9 is a schematic diagram showing an example of the calculation method of the position prediction of the head in relation to the second position prediction unit of the magnetic disk device according to the first embodiment.

FIG. 9 is a schematic diagram showing an example of the calculation method of the position prediction of the head in relation to the second position prediction unit of the magnetic disk device according to the first embodiment.

When the sector which is processed at time point k is a short servo sector (odd sector), the velocity is calculated from the difference between the position information obtained in the normal servo sector which is the sector one sector before (time point k−1) and the position information obtained in the normal servo sector which is the sector three sectors before (time point k−3). Thus, the second position prediction unit always performs the calculation of the velocity term from the difference between the last normal servo sectors.

More specifically, the second position prediction unit calculates prediction position p{hat} (k+1) as shown by formula 7.

$$\hat{p}(k+1) = \quad \text{(Formula 7)}$$
$$p(k) + \frac{p(k-1) - p(k-3)}{2} = p(k) + \frac{1}{2}p(k-1) - \frac{1}{2}p(k-3)$$

At this time, the discrete time transfer function from p to p{hat} can be shown as follows by using the z-transform.

$$\frac{\hat{P}(z)}{P(z)} = z^{-1} + \frac{1}{2}z^{-2} - \frac{1}{2}z^{-4} \quad \text{(Formula 8)}$$

Figure 10:
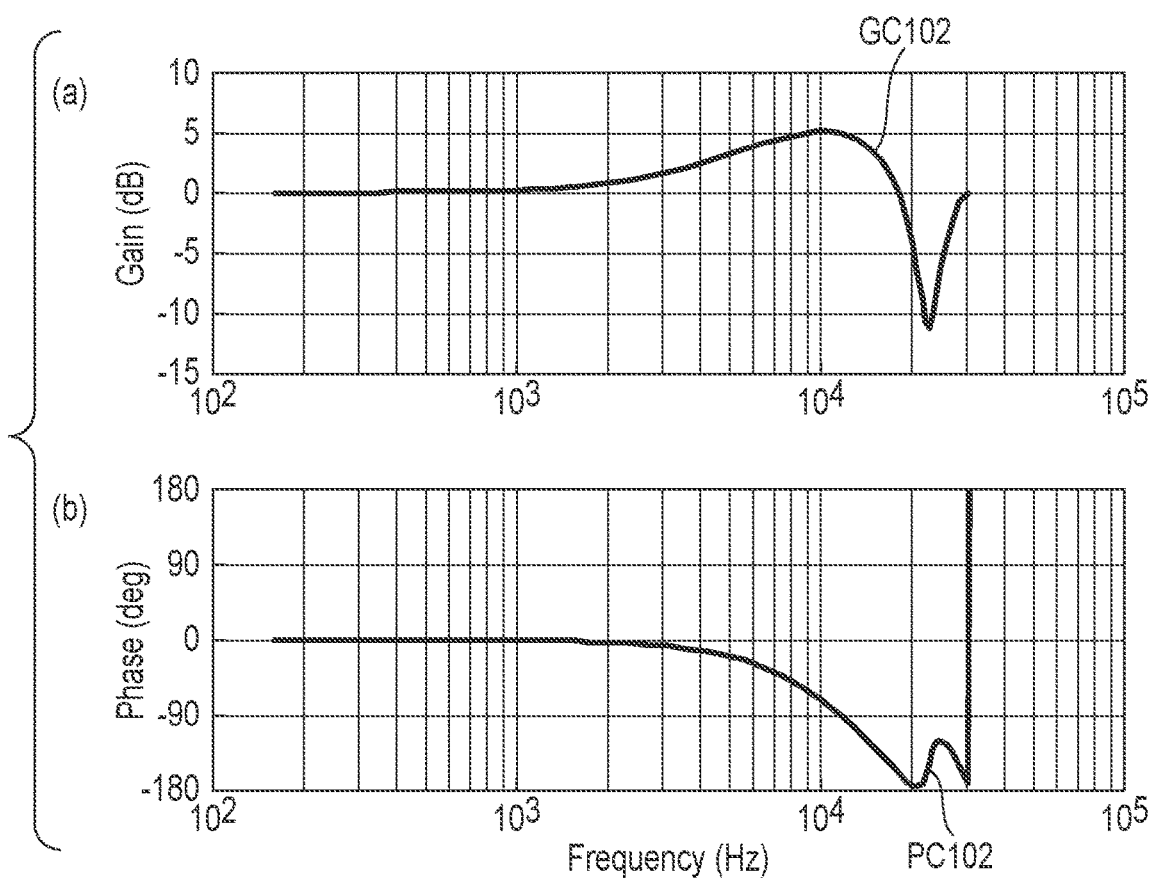
FIG. 10 is an example of the frequency characteristics of the second position prediction unit of the magnetic disk device according to the first embodiment.

FIG. 10 is an example of the frequency characteristics of the second position prediction unit of the magnetic disk device according to the first embodiment and shows the frequency characteristics of the position prediction process by formula 8.

In frequency characteristics GC102 and PC102, compared with frequency characteristics GC101 and PC101 of FIG. 8, the gain can be suppressed in high frequencies. Frequency characteristics GC102 and PC102 have a strong advantage in noise.

By the above procedure, the position of the head can be predicted by using the velocity term calculated from the position information of the last normal servo sectors.

Second Embodiment

This embodiment shows an example in which, when the sector which is processed at time point k is a short servo sector (odd sector), the velocity term is calculated from the normal servo position information obtained in the last normal servo sector and the short servo position information obtained in the short sector at time point k in the prediction of the position of the head at time point k+1. More specifically, the velocity term is obtained by applying a weighted average to the difference obtained from two normal servo position information items and the difference obtained from normal servo position information and short servo position information.

FIG. 11 is a schematic diagram showing an example of the calculation method of the position prediction of the head of a magnetic disk device according to a second embodiment.

Specifically, when the sector which is processed at time point k is a short servo sector (odd sector), a second position prediction unit 622 obtains the weighted average of the difference from the sector (normal servo sector) one sector before and the difference between the sector one sector before and the sector three sectors before (both are normal servo sectors) to incorporate the latest velocity in the calculation of the prediction position p{hat} (k+1) of the head at time point k+1.

For example, like formula 11, the weight may be arbitrarily set by a user, etc., by regarding the weight as a parameter such as a:b.

$$\hat{p}(k+1) = p(k) + \frac{a(p(k) - p(k-1)) + b\left(\frac{p(k-1) - p(k-3)}{2}\right)}{a+b} \quad \text{(Formula 9)}$$
$$= p(k) + \frac{ap(k)}{a+b} + \frac{\left(\frac{b}{2} - a\right)p(k-1)}{a+b} + \frac{-\frac{b}{2}p(k-3)}{a+b}$$

The frequency characteristics of the discrete time transfer function from p to p{hat} can be adjusted by changing the ratio between a and b, and thus, the gain in a high range and phase lag balance can be adjusted. The weight can be arbitrarily set. For example, when the weight is 1:2, as shown in the following formula, the term of p(k−1) is canceled, and the calculation formula is simplified like formula 10. In this formula, the error included in the difference term (velocity term) of the prediction position is affected by the error of the position information demodulated from short servo sectors. However, the effect can be suppressed so as to be √(⅓) (showing the square root of ⅓).

$$\hat{p}(k+1) = p(k) + \frac{p(k) - p(k-1) + \frac{p(k-1) - p(k-3)}{2} \times 2}{3} \quad \text{(Formula 10)}$$

-continued $$= p(k) + \frac{p(k) - p(k-3)}{3} = 1\frac{1}{3}p(k) - \frac{1}{3}p(k-3)$$

At this time, the discrete time transfer function from p to p{hat} can be shown as follows by using the z-transform.

$$\frac{\hat{P}(z)}{P(z)} = 1\frac{1}{3}z^{-1} - \frac{1}{3}z^{-4} \quad \text{(Formula 11)}$$

FIG. 12 is an example of the frequency characteristics of the second position prediction unit of the magnetic disk device according to the second embodiment.

It is clear that frequency characteristics GC201 and PC201 are intermediate characteristics between frequency characteristics GC101 and PC101 of FIG. 8 and frequency characteristics GC102 and PC102 of FIG. 10.

Figure 13:
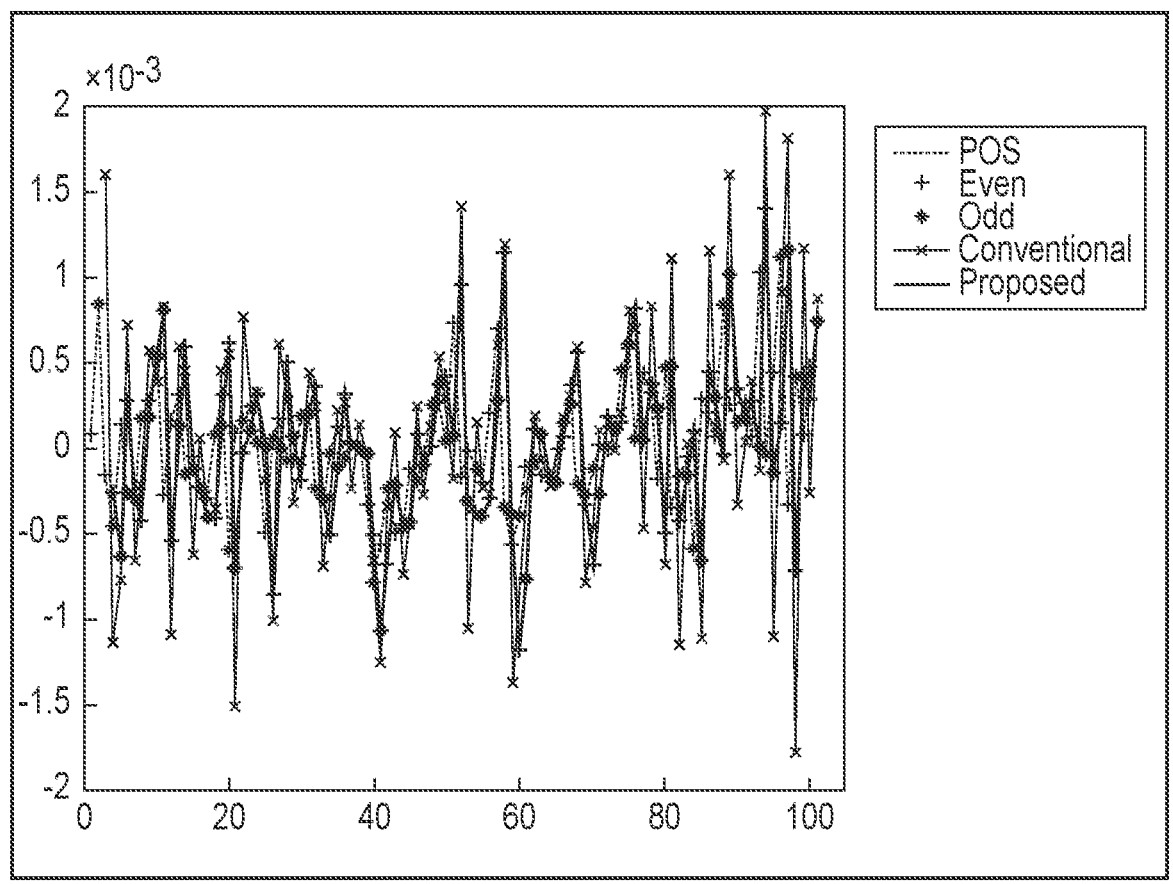
FIG. 13 is a diagram showing the time history waveforms of the demodulation position and the prediction position in the magnetic disk device according to the second embodiment.

FIG. 13 is a diagram showing the time history waveforms of the demodulation position and the prediction position in the magnetic disk device according to the embodiment. The horizontal axis indicates time (corresponding to time point k). The vertical axis indicates the position error.

The symbol "POS" shows the case (corresponding to p(k) of FIG. 4, etc.) of the demodulated head position. The symbol "Even" shows the case (corresponding to p{hat} (k+1) of FIG. 7) of the prediction position of the head when normal servo information (corresponding to p(k) of FIG. 7) is obtained as the latest position information. The symbol "Odd" shows the case (corresponding to p{hat} (k+1) of FIG. 9) of the prediction position of the head when short servo information is obtained as the latest position information (corresponding to p(k) of FIG. 9). The symbol "Conventional" shows the case (corresponding to p{hat} (k+1) of FIG. 4) of a conventional example of the prediction position of the head. The symbol "Proposed" shows the case (corresponding to p{hat} (k+1) of FIG. 11) of the prediction position of the head shown in the second embodiment. In the example of FIG. 13, the positional error tends to be less in the cases of Even and Odd compared to the case of Conventional, and intermediate characteristics of Even and Odd are obtained in the case of Proposed.

By the above procedure, the position of the head can be predicted by using the velocity term calculated from the position information of the last normal servo sectors. In addition, a weighted average which weights velocity calculation between a normal servo sector and a short servo sector can be performed.

In the example of the embodiment, two velocity terms are calculated at time point k for obtaining the latest position information by using past normal servo position information up to time point k−3. However, the position of the head may be predicted relative to time point k+1 by increasing the number of velocity terms and weighting them using the older normal servo position information.

At least one of the embodiments described above can provide a magnetic disk device and a prediction method such that the position of a head is predicted based on a head position demodulated by a short servo system.

The above embodiments show an example of a short servo system in a case where normal servo information is written to all servo sectors. However, the short servo system has various types. For example, different types of servo information are written for different servo sectors as normal servo information and short servo information. In general, a short servo technique decreases the servo occupancy on a medium by reducing servo information compared to normal servo information. In these cases, similarly, the embodiments can be applied when the normal servo demodulation unit 401 and the short servo demodulation unit 402 read normal servo information and short servo information at time points, respectively, demodulate the position information of the head 19 and output the position information to the servo control unit 62.

In the example of the embodiments, as shown in FIG. 2(e), a normal servo sector alternates with a short servo sector. However, the configuration is not limited to this case. For example, even in a case where a normal servo sector does not alternate with a short servo sector like the order of a normal servo sector, a normal servo sector, a short servo sector, a normal servo sector and a normal servo sector, effects similar to those of the embodiments may be obtained by obtaining the velocity term using the past normal servo information relative to the time point for obtaining the latest position information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Processing steps in the flowcharts and sequence charts, and the like described in the aforementioned embodiments are within the scope of the invention even if steps are exchanged, deleted, or added without departing from the spirit and scope of the invention.

Processings indicated in the flowcharts, sequence charts, and the like may be realized by hardware such as CPU, IC chip, digital signal processor (Digital Signal Processor: DSP), software operable in a computer including a microcomputer (program, for example), or a combination of hardware and software.

Furthermore, claims written as a processing logic, as a program including instructions executing in a computer, or as a computer-readable recording medium with the instruction are encompassed within the scope of the invention. Furthermore, terms used in the above are not limited, and other expressions which are understandable as substantially the same are encompassed within the scope of the invention.

What is claimed is:

1. A magnetic disk device comprising:
   a disk;
   a head;
   a head position demodulation unit which demodulates a position of the head (head position) by performing switching between normal servo demodulation for processing servo information written to a servo sector of the disk and short servo demodulation for processing servo information by a short servo system; and
   a controller which controls the position of the head, wherein
   the controller comprises:
   a head position prediction unit which predicts a head position; and
   a write inhibition determination unit which determines that data write operation to the disk by the head is inhibited based on the predicted head position (head prediction position), and the head position prediction unit performs position prediction by using a latest head position obtained by demodulation by the head position demodulation unit and a head position obtained by past demodulation by normal servo demodulation, the controller further comprising:

a first position prediction unit which calculates a prediction position by a first calculation formula when the latest head position is a head position (normal head position) obtained by the normal servo demodulation; and a second position prediction unit which calculates the prediction position by a second calculation formula which is different from the first calculation formula when the latest head position is a head position (short head position) obtained by the short servo demodulation.

2. The magnetic disk device of claim 1, wherein
the head position prediction unit performs switching between the first position prediction unit and the second position prediction unit.

3. The magnetic disk device of claim 1, wherein
the first position prediction unit obtains the prediction position of the head using a velocity term of a position obtained by a difference between last two normal head positions.

4. The magnetic disk device of claim 1, wherein
the second position prediction unit obtains the prediction position of the head using a velocity term of a position obtained by a difference between last two normal head positions.

5. The magnetic disk device of claim 4, wherein
the second position prediction unit obtains a plurality of differences between past normal head positions and obtains the prediction position of the head using a weighted average of the differences.

* * * * *